US009159220B2

(12) United States Patent
Lee et al.

(10) Patent No.: US 9,159,220 B2
(45) Date of Patent: Oct. 13, 2015

(54) LIGHTING APPARATUS HAVING AN AUDIO DEVICE AND METHOD OF CONTROLLING THE SAME

(71) Applicants: Hongkyu Lee, Seoul (KR); Sangman Kim, Seoul (KR)

(72) Inventors: Hongkyu Lee, Seoul (KR); Sangman Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 268 days.

(21) Appl. No.: 13/654,992

(22) Filed: Oct. 18, 2012

(65) Prior Publication Data

US 2013/0294050 A1 Nov. 7, 2013

(30) Foreign Application Priority Data

May 7, 2012 (KR) ........................ 10-2012-0048157

(51) Int. Cl.
*H04M 1/22* (2006.01)
*G08C 17/02* (2006.01)

(52) U.S. Cl.
CPC ............ *G08C 17/02* (2013.01); *G08C 2201/93* (2013.01)

(58) Field of Classification Search
CPC ..... F21V 33/0056; G08C 17/02; H04R 1/028
USPC .......................... 362/249.05, 249.12, 86, 801
See application file for complete search history.

(56) References Cited

U.S. PATENT DOCUMENTS 7,284,061 B2 * 10/2007 Matsubayashi et al. ...... 709/229
7,606,379 B2 * 10/2009 Ivey et al. ..................... 381/160
2003/0093670 A1 5/2003 Matsubayashi et al.
2008/0239887 A1 * 10/2008 Tooker et al. .............. 369/30.06
2009/0067663 A1 3/2009 Ivey et al.
2009/0210729 A1 * 8/2009 Adams et al. ................. 713/320
2012/0106128 A1 5/2012 Massara et al.

FOREIGN PATENT DOCUMENTS

| | | | |
|---|---|---|---|
| DE | 103 42 593 | A1 | 6/2005 |
| EP | 2 400 780 | A2 | 12/2010 |
| GB | 2 387 466 | A | 10/2003 |
| KR | 10-2009-0026560 | A | 3/2009 |
| KR | 10-2010-0138500 | A | 12/2010 |
| KR | 10-2011-0055807 | A | 5/2011 |

OTHER PUBLICATIONS

Prithvi Ganesh K, Iphone 4 Siri, Nov. 7, 2011, Bit stream! (alpha), pp. 1-3, https://eceforum.wordpress.com/2011/11/07/iphone-4-siri/.*
German Office Action dated Jun. 24, 2013.

* cited by examiner

*Primary Examiner* — Jason Moon Han
(74) *Attorney, Agent, or Firm* — Ked & Associates, LLP

(57) ABSTRACT

Provided is a lighting apparatus which may include an audio system, a light emitting device including a plurality of LEDs, a communication module to receive data for the audio system or the light emitting device, a switch provided between the communication module and the audio system to control a connection between the communication module and the audio system, and a controller to control the audio system and the light emitting device. The controller may be configured to determine whether the received data is associated with the lighting emitting device or the audio system, and controls the switch to connect to the audio system when the received data is associated with the audio system.

17 Claims, 10 Drawing Sheets

LIGHTING APPARATUS HAVING AN AUDIO DEVICE AND METHOD OF CONTROLLING THE SAME

CROSS-REFERENCE TO RELATED APPLICATION(S)

This application claims the benefit of the Patent Korean Application No. 10-2012-0048157, filed in Korea on May 7, 2012, which is hereby incorporated by reference as if fully set forth herein.

BACKGROUND

1. Field

A lighting apparatus having an audio device and a method of controlling the same are disclosed herein.

2. Background

Lighting apparatuses having an audio device and methods of controlling the same are known. However, they suffer from various disadvantages.

BRIEF DESCRIPTION OF THE DRAWINGS

The embodiments will be described in detail with reference to the following drawings in which like reference numerals refer to like elements, wherein.

DETAILED DESCRIPTION

Figure 1:
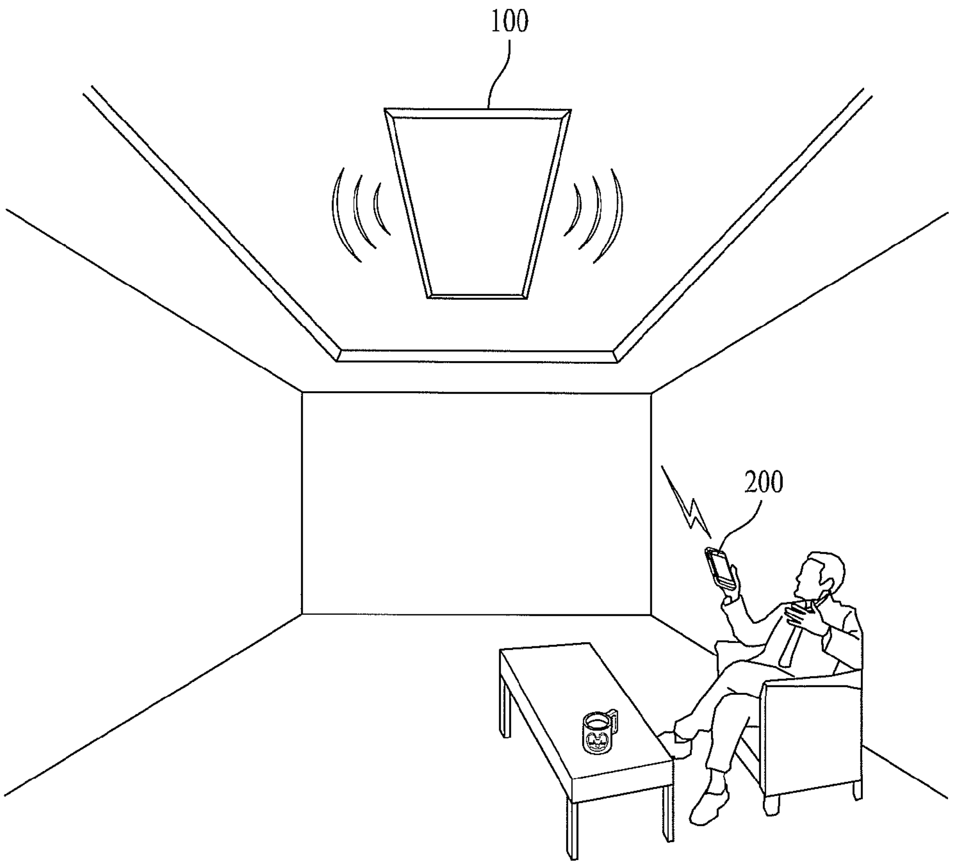
FIG. 1 is a diagram illustrating a usage of a lighting apparatus according to an embodiment as broadly described herein.

A lighting apparatus according to an exemplary embodiment of the present disclosure will be described in detail in reference to the accompanying drawings as follows. The accompanying drawings are illustrated to describe examples of the present disclosure and they are provided to explain the present disclosure more specifically, as the present disclosure is not limited thereto.

Reference will now be made in detail to the specific embodiments of the present disclosure, examples of which are illustrated in the accompanying drawings. Wherever possible, the same reference numbers will be used throughout the drawings to refer to the same or like parts. Repeated description will be omitted and the size and appearance of each part illustrated for explanation convenience may be exaggerated or minimized and may not be to scale.

Moreover, terminology including ordinal numbers like ‘first’ and ‘second’ may be used to explain various parts of the present disclosure, however, the various parts are not limited by the terminology. The terminology is used only to distinguish one of the parts from the others.

Generally, types of light sources which may be used in a lighting apparatus include an incandescent lamp, an electric discharge lamp or a fluorescent lamp. Such light sources may be used for various purposes such as for domestic usage, landscape usage, industrial usage, or the like. However, the incandescent lamp which is a resistive light source has disadvantages in light emitting efficiency and heat radiation. The electric discharge lamp has disadvantages of high costs and high voltage. The fluorescent lamp has an environmental disadvantage due to its use of mercury.

Light emitting diodes (LEDs) solve these and other disadvantages of the above described light sources. Light emitting diodes (LED) have advantages in high light emitting efficiency, emit a variety of colors as well as allow flexibility and freedom in design.

A light emitting diode (LED) is a semiconductor element which emits light when a forward voltage is applied to the light emitting diode. The light emitting diode (LED) has a relatively longer lifespan and lower power consumption. In addition, it has electrical, optical and physical properties which are suitable for mass production. Because of that, the light emitting diodes (LED) have been rapidly replacing the incandescent lamps and fluorescent lamps.

Meanwhile, smart technology has been taking center stage to provide a ubiquitous computing environment enabling computing anytime, at any place, and with any device, to control, for example, home appliances via home networking and the Internet based on wired or wireless communication.

Such smart technology has been integrated into various fields including lighting apparatuses. Lighting characteristics of a lighting apparatus may be controlled with a terminal such as a mobile phone, a notebook computer or a tablet personal computer. Moreover, a sound system and a lighting apparatus may be integrated and the terminal may be used to transmit and play an audio file through the lighting apparatus.

A conventional lighting apparatus having a sound system integrated thereto has required technology that enables transmission and reception of sound source information or lighting control information while preventing data collision, reducing power consumption, while connected wirelessly with a terminal to control the lighting apparatus.

Accordingly, the present disclosure is directed to a lighting apparatus that obviates these and other disadvantages. One object of the present disclosure is to provide a lighting apparatus that is able to reduce unnecessary power consumption of a sound device based on sound data transmitting from a terminal.

FIG. 1 is a diagram illustrating a lighting apparatus. The lighting apparatus 100 may enable a user to use a terminal 200 in simultaneously controlling lighting characteristics of a light emitting device 120 such as colors, brightness, or color temperatures as well as audio output via sound file data transmission. It should be appreciated that the lighting apparatus 100 as broadly described herein is not limited to the installation as illustrated in FIG. 1, and may be applied, for example, to a plurality of lighting apparatuses installed in an office building.

Figure 2:
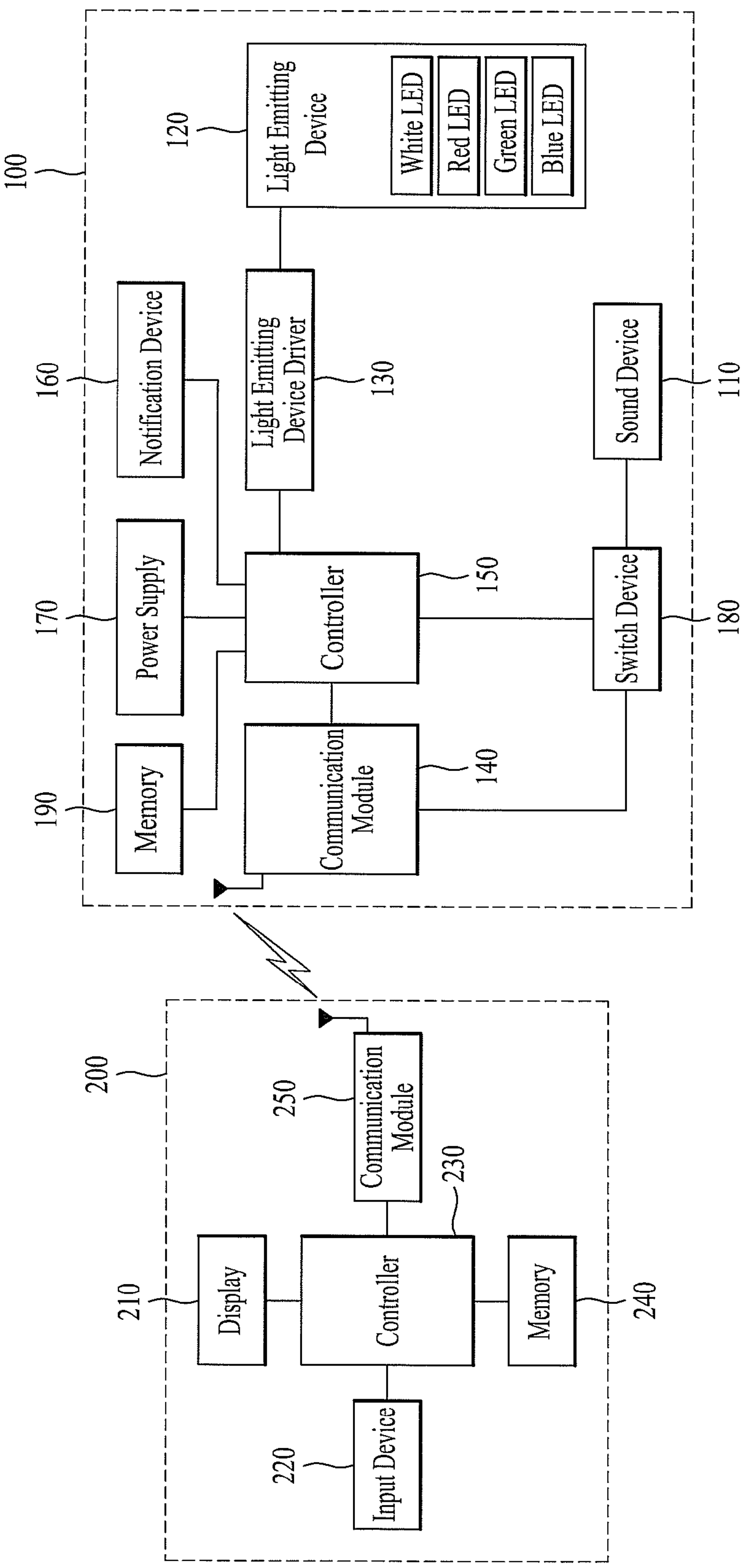
FIG. 2 is a block diagram illustrating component elements of the lighting apparatus of FIG. 1.
Figure 3:
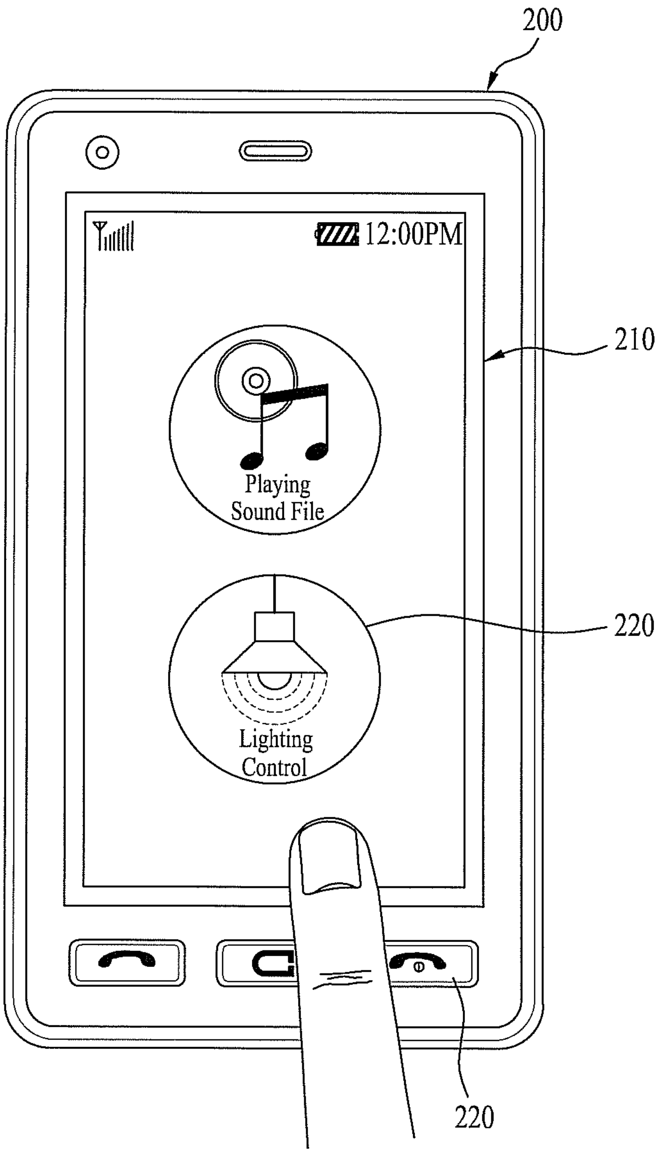
FIG. 3 is a plane view illustrating a display and an input device of the terminal of FIG. 1.

FIG. 2 is a block diagram illustrating various components of the lighting apparatus of FIG. 1. FIG. 3 is a view illustrating a display and an input device of the terminal of FIG. 1.

The lighting apparatus 100 may include a sound device 110, a light emitting device 120 having a plurality of LEDs, a controller 150 to control the sound device 110 and the light emitting device 120, a communication module 140 to receive sound data or lighting control data based on the control of the controller 150, a switch device 180 provided between the communication module 140 and the sound device 110, and at least one terminal 200 to transmit the sound data or the lighting control data to the communication module 140 based on an input setting.

First of all, the sound device 110 may be employed to output sound data transmitted from the terminal 200. Also, the sound device 110 may output sound data stored in a memory 190. The sound data may be an audio file and the sound device 110 may be an audio device (or audio system) for playing audio files. The sound device 110 may be connected with the controller 150 via the switch device 180 such that a control signal related to power and audio output may be controlled.

Next, the light emitting device 120 may control lighting characteristics based on the sound information outputted from the sound device 110. The light emitting device 120 may include the plurality of LEDs. Specifically, the light emitting device 120 may include a white LED, a red LED, a green LED, a blue LED, or the like. The light emitting device 120 may be driven by a drive current supplied from a light emitting device driver 130.

The communication module 140 may receive and transmit a page signal for establishing a connection (e.g., the communication channel) with the terminal 200, the sound data and the lighting control data. The communication module 140 may be connected with the controller 150 to transmit and receive data to and from the terminal 200, but also to transfer the received data to the controller 150. Also, the communication module 140 may be connected with the switch device 180 to transfer the received sound data to the sound device 110 via the switch device 180. The switch device 180 will be described in detail hereinafter.

Meanwhile, the communication module 140 may be a Bluetooth module. Bluetooth requires a low operating voltage (100 mW) and may be more economical to install. Accordingly, Bluetooth may be appropriate for a wireless personal area network within approximately 100 m for exchanging data between the terminal 200 and the lighting apparatus 100, e.g., within a room or building.

Rather than Bluetooth, the communication module 140 may use Frequency Modulation (FM), Code Division Multiple Access (CDMA), Industrial Scientific and Medical Equipment (ISM) band, WiFi, Infrared Ray, Radio Frequency Identification (RFID), Zigbee USN, or another appropriate communication protocol for wireless communication with the terminal 200.

The controller 150 may control the sound device 110 and the light emitting device 120 based on the data received from the communication module 140. For example, the controller 150 may control the switch device 180 to output the sound data transmitted from the terminal 200 to the sound device 110. Also, the controller 150 may transmit a control signal to the light emitting device driver 130 based on the lighting control data to control the lighting characteristics. For example, the controller 150 may control various aspect of the audio to control the volume, control section repeat or add various sound effects, rather than the output of the sound information from the sound device 110.

A notification device 160 may display a notification for aiding in establishing the communication channel between the lighting apparatus 100 and the terminal 200. The notification device 160 may display a notification signal to indicate when the communication channel between the terminal 200 and the lighting apparatus 100 may be established to guide the user. The notification device 160 may, for example, include a speaker to output an alarm sound when forming the communication channel with the terminal 200, a light bulb to display whether to form the communication channel, or another appropriate type of notification means. Prescribed notification signals may be produced to indicate various states including availability of a lighting apparatus 100 to establish a connection, a confirmation of a connection, an error state, or another appropriate type of state.

A power supply 170 may be connected to a power source to supply electric power to the lighting apparatus 100. The power supply 170 may include an AC-to-DC converter to convert AC power into DC. For power efficiency, the power supply 170 may further include a power saving circuit or a voltage drop regulator to supply a predetermined amount of constant current.

The switch device 180 may be switched on and off based on the sound data received from the terminal 200 to control the operational state of the sound device 110. The switch device 180 may be provided between the communication module 140 and the sound device 110 to relay the sound data received by the communication module 140 to the sound device 110. Also, the switch device 180 may be connected with the controller 150 to transmit the control signal from the controller 150 as well as signals to control the electric power to the sound device 110.

In one example, when the switch device 180 is switched on by the controller 150, the sound device 110 may be powered on (or driven) and the sound data may be transferred from the communication module 140 to the sound device 110, simultaneously. In contrast, when the switch device 180 is switched off, the power supply may be cut off to stop driving the sound device 110.

The controller 150 may switch the switch device 180 on and the sound device 110 may be driven only when the sound data from the terminal 200 is received, without maintaining the driving state of the sound device 110. That is, the sound device 110 is not powered when sound data is not being received from the terminal 200. Accordingly, power consumption in the lighting apparatus may be reduced.

In addition, the switch device 180 may simultaneously control whether the sound data (e.g., audio file) is sent to the sound device 110, whether the power is supplied to the sound device 110, and whether the control signal from the controller 150 is sent to the sound device 110. Hence, since the multiple functions are simultaneously performed by the switch device 180, certain malfunctions of the sound device 110 may be prevented. For example, when failing to receive the sound data from the terminal 200, the controller 150 may switch off the switch device 180 and the sound device 110 may no longer be driven. Also, the control signal from the controller 150 may not be transmitted to the sound device 110, and hence potential malfunctions may be prevented.

In one example, the switch device 180 may be placed in an off state to stop the driving of the sound device 110, unless the sound data is received within a predetermined time period while in an on-state. For example, when the sound data is not received, the sound device 110 may continue to be driven even when it is not outputting a sound file and electric power may continue to be consumed. In this instance, unnecessary power consumption is caused by the continuous driving of the sound device 110 after the switch device 180 is off in a predetermined time period. Hence the switch device 180 may be provided to stop the driving of the sound device 110 when the output of the sound information from the sound device 110 is complete. Accordingly, the unnecessary power consumption caused by the continuous driving of the sound device 110 may be prevented.

The switch device 180 may be switched on and off by the controller 150, the switch device 180 may be automatically turned on and off based on a signal from the terminal 200 such as, for example, a page signal or a sound data transmitted directly from the terminal 200.

Meanwhile, the terminal 200 that transmits and receives the sound data or the lighting control data to the communication module 140 may include a display 210, an input device 220, a controller 230, a memory 240 and a communication module 250. The user may select desired sound data (e.g., audio file) from the input device 220 or input/select the lighting characteristics of the light emitting device 120 via the input device 220. The sound data or lighting control data inputted via the input device 220 may be transmitted to the communication module 140 of the lighting apparatus 100.

The sound data may be stored in the memory 240 of the terminal 200 and lighting control data may be preset to correspond to a sound file category and stored in the memory 240. The setup and the operational state of the lighting apparatus 100 may be displayed via the display 210.

As shown in FIG. 3, the display 210 of the terminal 200 may be a touchscreen and the input device 220 may be displayed on the display 210. Accordingly, the user can touch the touch screen to play a sound file or set up lighting conveniently and advantageously. Alternatively, an additional keypad may be provided on the terminal 200 as the input device 220. For example, the input device 220 may be a manual button on the terminal 200 and the functions for, for example, playing a sound file may be assigned to the button.

Figure 4:
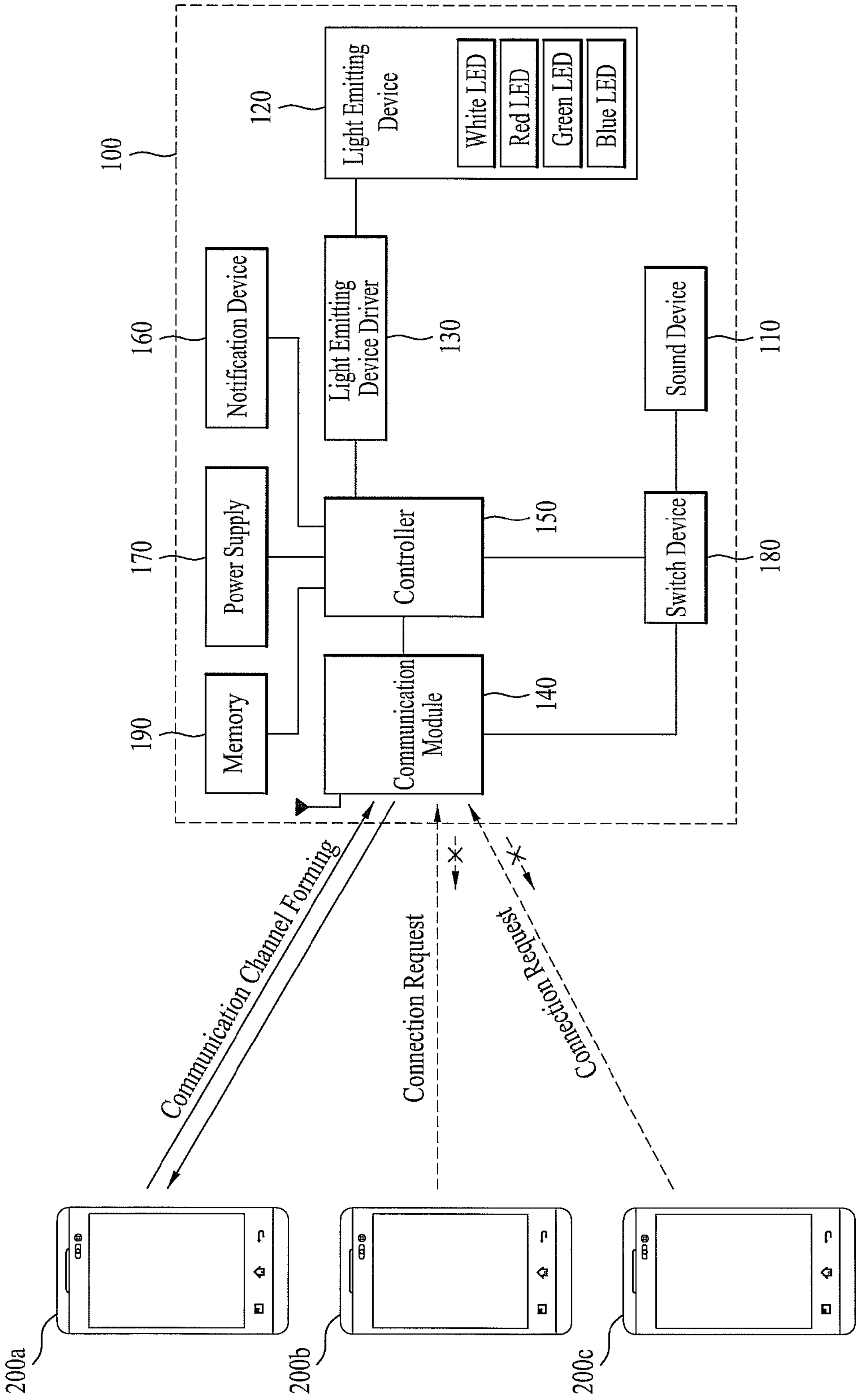
FIGS. 4 and 5 are block diagrams illustrating a communication channel between a plurality of terminals and a communication module according to an embodiment as broadly described herein.
Figure 5:
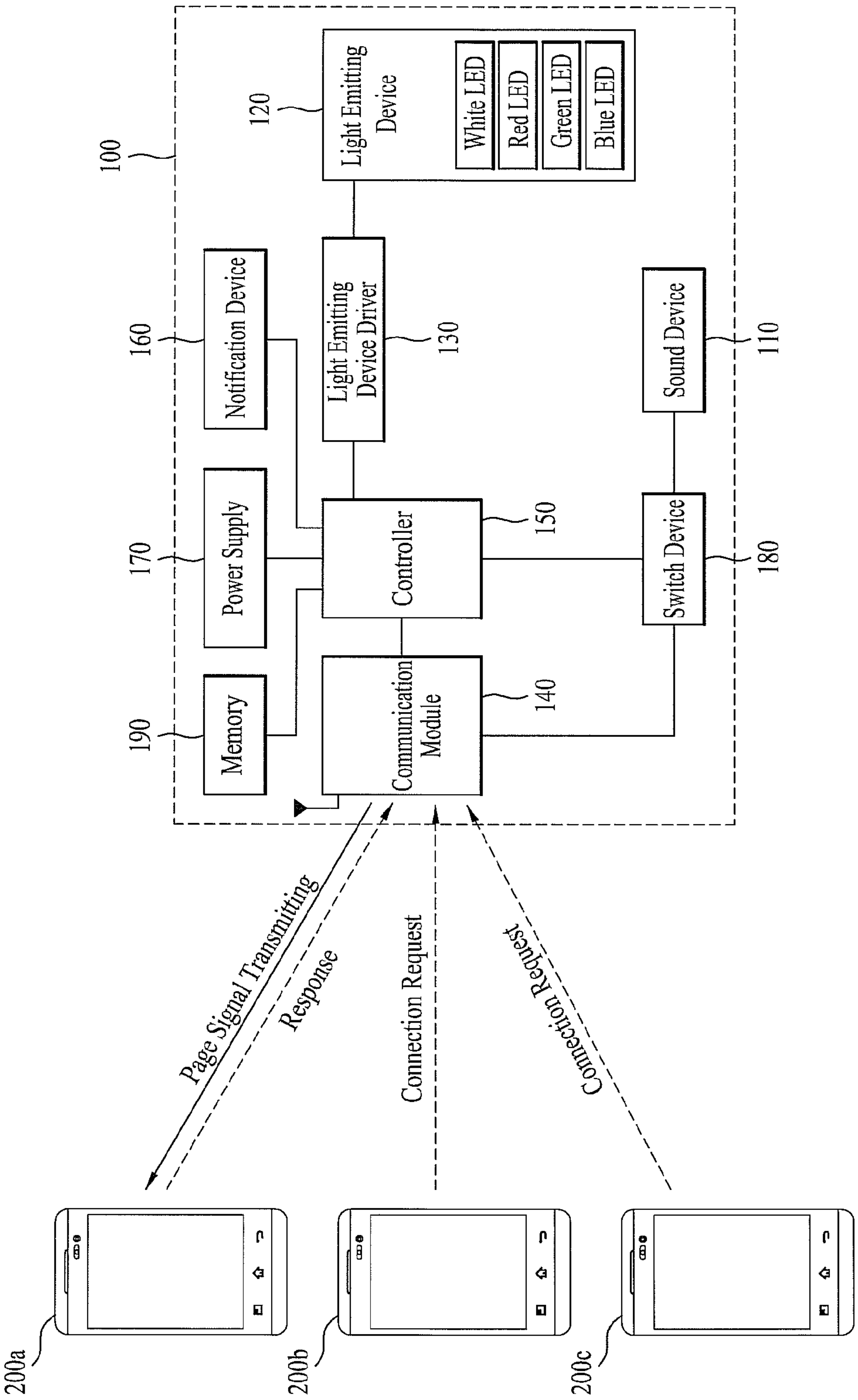

FIG. 4 is a block diagram illustrating a communication channel formed between a plurality of terminals and a communication module according to an embodiment. FIG. 5 is a block diagram illustrating a communication channel formed between a plurality of terminals and a communication module according to another embodiment.

The controller 150 may control the communication module 140 to form a communication channel with a first terminal 200*a* having the highest priority. The priority for establishing a connection among a plurality of connection requests may be based on the order in which the requests are received, a predetermined priority setting for the terminals, or another appropriate criteria for determining priority. For example, the communication channel may be formed between the communication module 140 and the first terminal 200*a* which makes the first attempt to connect among terminals 200*a*, 200*b* and 200*c* which have transmitted page signals to the lighting apparatus 100. The use of a priority for establishing a communication channel to a remote terminal may enable a simple and convenient process for establishing a communication channel.

As illustrated in FIG. 4, the controller 150 may control the communication module 140 to not respond to the page signals of the other terminals 200*b* and 200*c*, once the process for establishing a communication channel with the first terminal 200*a* has begun. For example, errors may occur when multiple terminals initiate processes to establish a connection with the lighting apparatus 100 such as, for example, multiple terminals being able to simultaneously control the lighting apparatus 100, or the like. Accordingly, a possible cross in control signals for the sound device 110 and the light emitting device 120 from multiple terminals may be prevented and the user's setup may be prevented from, for example, being changed by another person.

Of course, after forming the communication channel between the communication device 140 and the first terminal 200*a*, a plurality of communication channels may be formed simultaneously in response to the page signals of the other terminals 200*b* and 200*c*.

In one embodiment, a Personal Identification Number (PIN) code may be used to determine whether to establish a connection between a lighting apparatus 100 and a terminal 200*a*, 200*b*, 200*c*. When the page signals are transmitted to the communication module 140 from the plurality of the terminals 200*a*, 200*b* and 200*c*, the controller 150 may compare a PIN code received from the plurality of the terminals 200*a*, 200*b* and 200*c* with a PIN code stored in the memory 190. Based on the result of the comparison, the controller 150 may control the communication module 140 to establish a communication channel with the first terminal 200*a* having the highest priority out of the terminals 200*a*, 200*b* and 200*c* having the identical PIN code. In this instance, the lighting apparatus 100 may further include the memory 190 where the PIN code of the communication module 140 and the connection priority of the terminals 200*a*, 200*b* and 200*c* are stored (e.g., a connection priority list, table, or the like).

Specifically, the controller 150 may control the communication module 140 to transmit a PIN code requesting signal to the plurality of the terminals 200*a*, 200*b* and 200*c* which transmitted the page signals. Upon receiving a response from each of the plurality of terminals 200*a*, 200*b* and 200*c*, the controller 150 may compare the received PIN code with the PIN code stored in the memory 190. The controller 150 verifies each terminal has provided the correct PIN code. Thereafter, the controller 150 may determine the priority of the terminals 200*a*, 200*b* and 200*c* having the corresponding PIN codes based on a predetermined criteria.

Accordingly, the lighting apparatus 100 may form the communication channel with the terminal having the highest priority (e.g., first terminal 200*a*). Meanwhile, the communication module 140 may not respond to the terminals which do not provide an acceptable PIN code.

In one embodiment, the priority of the plurality of terminals 200*a*, 200*b* and 200*c* based on the PIN code received as well as various predetermined criteria. Here, each of the terminals 200*a*, 200*b* and 200*c* may have different PIN codes. Each PIN code may be stored in memory 190 and a corresponding priority may be assigned based on the PIN codes. Moreover, if multiple terminals have the same PIN code, a predetermined criteria may be applied to determine the priority among those terminals having the same PIN code. For example, priority may be set based on chronological order in which a request to connect was received, based on a user set priority for each device, or another appropriate criteria for determining priority of the terminals 200.

The process of forming communication channels using the PIN code may have an advantage of preventing the light emitting device 120 or the sound device 110 from being controlled by unauthorized terminals.

As illustrated in FIG. 5, the controller 150 may control the communication module 140 to transmit a page signal to the first terminal 200*a* when a page signal is transmitted to the communication module 140 from the other terminals 200*b* and 200*c* while the sound device 110 and the light emitting device 120 are being driven based on the sound data or lighting control data received from the first terminal 200*a*.

Specifically, in this situation, a connection request signal may be received at the communication module 140 after the communication channel between the lighting apparatus 100 and the first terminal 200*a* has terminated. That is, the connection request signal may be received after the data transmission from the first terminal is complete and while the sound information received from the first terminal 200*a* is being outputted.

When receiving a response from the first terminal 200*a* with respect to the page signal transmitted to the first terminal 200*a,* the controller 150 may transmit a signal denying the connection request to the requesting terminals 200*b* and 200*c*. This signal denying the connection request may include a reason for denying the connection request. For example, only when a response is not received from the first terminal 200*a* may the communication channel between the other terminals 200*b* and 200*c* be formed. Hence, the user may prevent, for example, the preset sound file from being changed during playback due to a connection to the other terminals 200*b* or 200*c*.

In addition, when the communication module 140 receives the page signal in a state of forming the communication channel with the first terminal 200*a,* the controller 150 may control the communication module 140 to transmit a signal for checking whether a connection with the second terminal 200*b* is authorized to the first terminal 200*a*. In contrast to the previously described situation, in this case the communication channel between the lighting apparatus 100 and the first terminal 200*a* is maintained at the moment when the page signal of the second terminal 200*b* is received. For example, the request to authorize the second terminal 200*b* may be sent to the first terminal 200*a* during the connection establishment process or after the connection has been established.

In this instance, when receiving a signal from the first terminal 200*a* to authorize the connection of the second terminal 200*b,* the controller 150 may control the communication module 140 to establish the communication channel with each of the first and second terminals 200*a* and 200*b*. An additional connection request signal may be transmitted from the other terminals (e.g., 200*c*) after the communication channel with the second terminal 200*b* is formed and signals authorizing connection may be transmitted from the first terminal 200*a* or both of the first and second terminals 200*a* and 200*b* in order to form additional communication channels.

Figure 6:
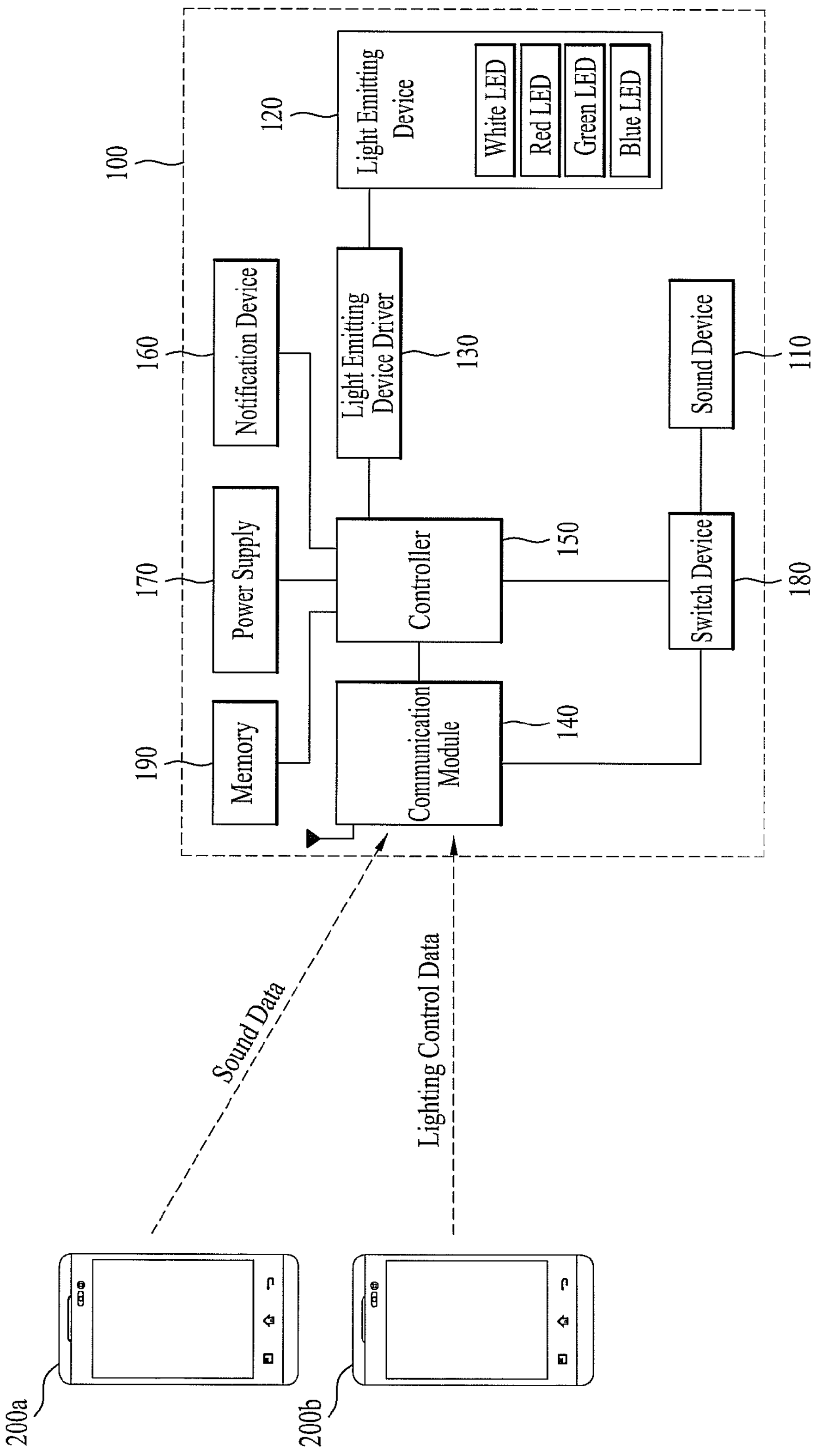
FIG. 6 is a block diagram illustrating data transmission between a plurality of the terminals and a communication module as broadly described herein.

FIG. 6 is a block diagram illustrating data transmission between a plurality of the terminals and a communication module as broadly described herein. Here, a first terminal 200*a* and a second terminal 200*b* may be connected to the lighting apparatus 100. The communication module 140 may receive sound data from the first terminal 200*a* and lighting control data from the second terminal 200*b,* or vice versa, when connected to both the first and second terminals 200*a* and 200*b*. For example, the sound data may be transmitted from the first terminal 200*a* to the sound device 110 to play an audio file and the lighting control data may be transmitted from the second terminal 200*b* to control the lighting characteristics. Accordingly, when sound data is not available in one terminal 200, another sound data may be transmitted from another terminal to playback an audio file at the sound device 110.

Also, when the communication channels are formed between the communication module 140 and the plurality of the terminals 200*a* or 200*b,* the controller 150 may receive sound data from one of the terminals 200*a* and 200*b,* and in response, the communication module 140 may shut off the sound data reception from the other one of the terminals. Accordingly, the sound data may be transmitted to the lighting apparatus 100 from the plurality of the terminals 200*a* and 200*b,* however, collision of the sound files played in the sound device 110 may be prevented when sound data is simultaneously transmitted to the lighting apparatus 100 from the terminals 200*a* and 200*b*.

Meanwhile, when a single communication channel is formed between the communication module 140 and the first terminal 200*a,* the controller 150 may receive only sound data from the first terminal 200*a*. The controller 150 may be configured to search the memory 190 to retrieve a control signal for the light emitting device 120 corresponding to the sound data. For example, the sound device 110 may play the sound data transmitted from the first terminal 200*a* and the light emitting device 120 may control the lighting characteristics based on a control signal or command stored in the memory 190.

Moreover, when receiving only the lighting control data from the first terminal 200*a,* the controller 150 may retrieve sound data stored in the memory 190 corresponding to the lighting control data received from the first terminal 200*a*. For example, the light emitting device 120 may be controlled based on the lighting control data transmitted from the first terminal 200*a* and the sound device 110 may output sound information based on the sound data stored in the memory 190.

Moreover, the sound data and/or the lighting control data may be stored in the memory 190 at the lighting apparatus 100. The audio and/or lighting control data stored in the memory 190 may be selected via the terminal 200*c* to playback a particular audio file or retrieve a particular configuration for the lighting. Moreover, the stored audio or lighting control data may be associated with a particular type of data (e.g., a prescribed audio file may correspond to a prescribed lighting file), the particular terminal 200, based on user or default setting, or the like. Hence, when a particular sound file stored in the memory 190 is selected through a terminal 200, a corresponding audio file may also be retrieved to control the light emitting device 120. Accordingly, the sound data or the lighting control data are not required to be stored in the terminal 200, and hence, the amount of data transmitted from the terminal 200 may be reduced.

Figure 7:
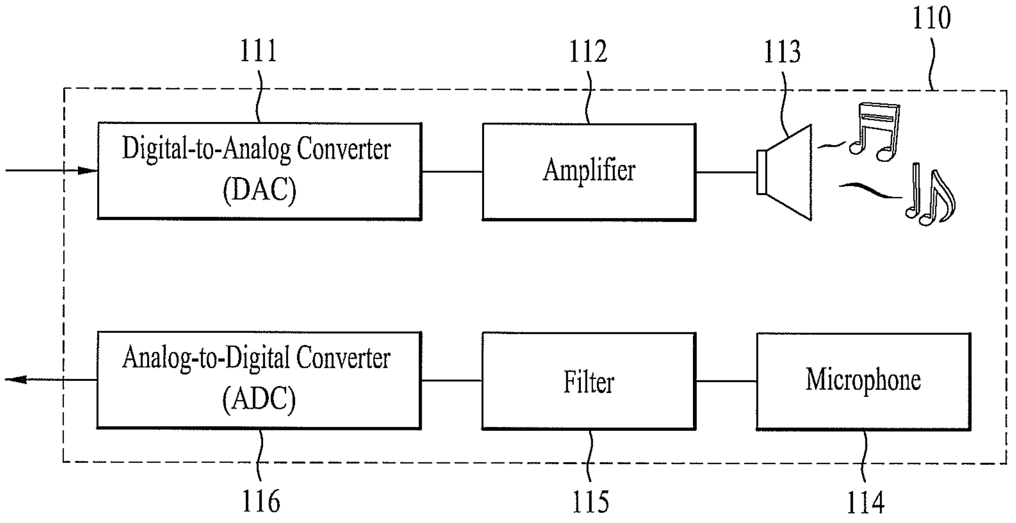
FIG. 7 is a block diagram illustrating a configuration of a sound device according to an embodiment as broadly described herein.

FIG. 7 is a block diagram illustrating a configuration of a sound device according to an embodiment as broadly described herein. The sound device 110 may include a digital-to-analog converter (DAC) 111 to convert sound data into an analog signal, an amplifier 112 to amplify the analog signal converted in the digital-to-analog converter 111, and a speaker 113 to output the analog signal as sound. In one example, the sound data transmitted from the terminal 200 may be converted into an analog signal in the sound device 110 and the analog signal may be amplified by the amplifier 112. Thereafter, the amplified analog signal may be outputted via the speaker 113.

The sound device 110 may further include a sound detecting device 114 (e.g., microphone) to detect an external sound file, a filtering part 115 to filter a frequency of the external sound file, and an analog-to-digital converter (ADC) 116 to convert the filtered analog signal into a digital signal. In one example, the sound device 110 may play the sound file and detect the sound file outputted from the outside to control the lighting characteristics of the light emitting device 120 based on a category of the sound file. The external sound file may be detected by the sound detecting part 114 and only a specific frequency of the external sound file may be extracted in the filtering part 115. After that, the analog signal having the specific frequency may be converted into the digital signal by the analog-to-digital converter 116.

According to an embodiment, the controller 150 may transmit the digital signal converted in the analog-to-digital converter 116 to the first terminal 200*a*. In response, the controller 150 may receive a lighting control data corresponding to the digital signal from the first terminal 200*a* to control the light emitting device 120. For example, the lighting control data may be received corresponding to the category of the external sound file outputted from a different music playing device and detected by the sound detecting device 114. The lighting characteristics of the lighting apparatus 100 may then be controlled based on the received lighting control data.

Figure 8:
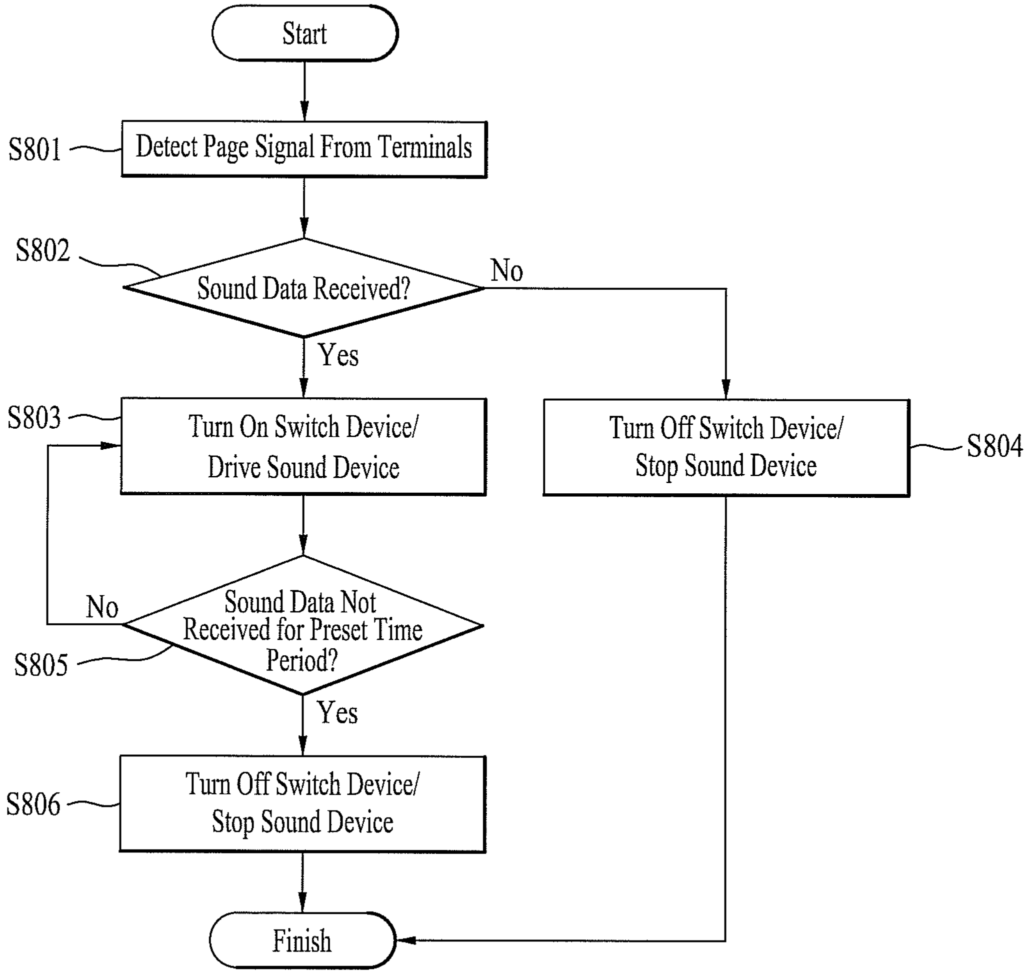
FIGS. 8 to 10 are flow charts of methods of controlling the lighting apparatus according to an embodiment as broadly described herein.

FIG. 8 is a flow chart of a method of controlling the lighting apparatus according to an embodiment as broadly described herein. The communication module 140 may detect a page signal transmitted from a terminal 200, in step S801. The communication module 140 may communicate using Bluetooth and it can search for the page signal of the terminal 200 transmitted in a local area of approximately 100 m. As mentioned above, the communication module 140 is not limited to Bluetooth and may be based on other types of communication protocols, such as, for example, those that enable greater communication range/distances such as CDMA, FM, or the like.

It may be determined whether sound data is received from the terminal 200 at the communication module 140, in step S802. When sound data is transmitted to the communication module 140 from the terminal 200, the switch device 180 may be switched on to drive the sound device 110, in step S803. When sound data is not transmitted to the communication module 140 from the terminal 200, the switch device 180 may be switched off to stop driving the sound device 110, in step S804.

As a result, the sound device 110 is not continuously driven irrespective of whether sound data is being received, and the sound device 110 may be driven only when the sound data is being received from a terminal 200 within range of the lighting apparatus 100. Accordingly, there is an advantage of reduced power consumption. Also, the control signal of the sound device 110 and the power supply to the sound device 100 may be controlled by the on/off state of the switch device 180 such that malfunction of the sound device 110 may be prevented, as previously described.

Meanwhile, it may be determined whether the sound data is not received for a preset time period, in step S805. When sound data is not received for a prescribed amount of time, the switch device 180 may be switched off and the sound device 110 may be stopped to no longer be driven, in step S806. For example, the sound device 110 may be powered-off.

As a result, the user need not turn off the sound device 110 separately and usage convenience may be enhanced. Also, the power consumption of the lighting apparatus may be advantageously reduced.

Figure 9:
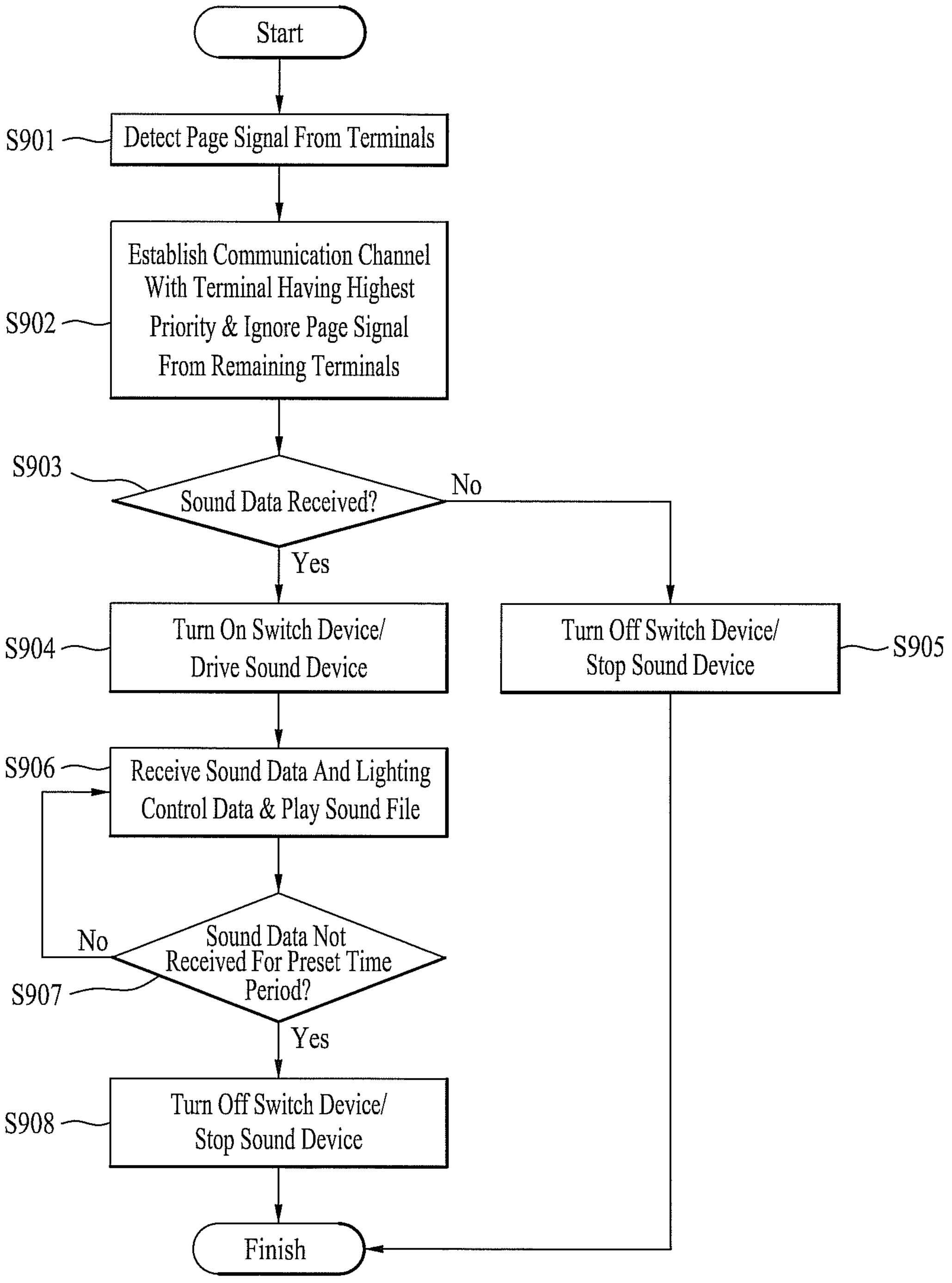

FIG. 9 is a flow chart of a method of controlling a lighting apparatus according to one embodiment as broadly described herein. The communication module 140 may detect a page signal transmitted from a terminal 200, in step S901. The communication module 140 may communicate using Bluetooth and it can search for the page signal of the terminal 200 transmitted in a local area of approximately 100 m. As mentioned above, the communication module 140 is not limited to Bluetooth and may be based on other types of communication protocols, such as, for example, those that enable greater communication range/distance such as CDMA, FM, or the like.

In step S902, when a plurality of page signals from a plurality terminals are detected, a communication channel may be formed with a terminal having the highest priority (e.g., terminal 200*a*). For example, the priority may be based on the chronological order in which the plurality of terminals 200*a*, 200*b*, 200*c* request a connection with the lighting apparatus 100.

For example, the communication channel may simply be formed with a terminal that has made the first connection request without using other authentication processes, such as requiring a PIN code as described hereinafter. Accordingly, the process for establishing a connection with the terminal may be made to be faster and more convenient.

When the communication channel is formed with the first terminal 200*a*, the communication module 140 may not respond to page signals from the other terminals. As the communication module 140 may be configured to not respond to the page signals from the other terminals, it may prevent multiple communication channels and potential collision of data for sound file playback or lighting control received from the multiple terminals.

In step S903, it may be determined whether sound data is received from the terminal 200 at the communication module 140. When sound data is transmitted to the communication module 140 from the terminal 200, the switch device 180 may be switched on to drive the sound device 110, in step S904. When sound data is not transmitted to the communication module 140 from the terminal 200, the switch device 180 may be switched off to stop driving the sound device 110, in step S905.

As a result, the sound device 110 is not continuously driven irrespective of whether sound data is being received, and the sound device 110 may be driven only when the sound data is being received from a terminal 200 within range of the lighting apparatus 100. Accordingly, there is an advantage of reduced power consumption. Also, the control signal of the sound device 110 and the power supply to the sound device 100 may be controlled by the on/off state of the switch device 180 such that malfunction of the sound device 110 may be prevented, as previously described.

In step S906, the sound data or lighting control data received from the first terminal 200*a* may be outputted to the sound device 110 and the light emitting device 120 based on the control of the controller 150. Meanwhile, it may be determined whether the sound data is not received for a preset time period, in step S907. When sound data is not received for a prescribe amount of time, the switch device 180 may be switched off and the sound device 110 may be stopped and no longer driven, in step S908. For example, the sound device 110 may be powered-off.

Figure 10:
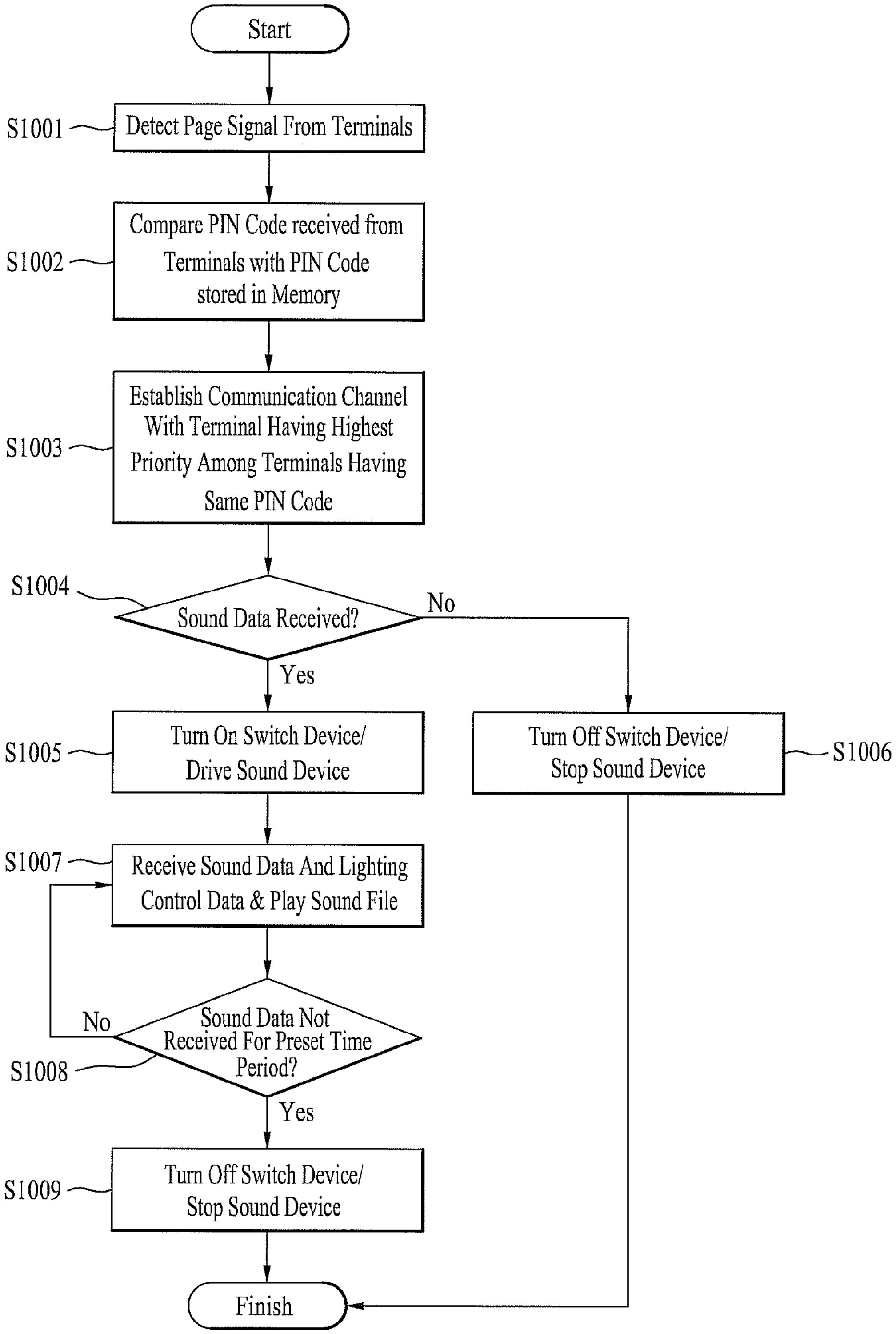

FIG. 10 is a flow chart of a method of controlling a lighting apparatus according to one embodiment as broadly described herein. The communication module 140 may detect a page signal transmitted from a terminal 200, in step S1001. The communication module 140 may communicate using Bluetooth and it can search for the page signal of the terminal 200 transmitted in a local area of approximately 100 m. As mentioned above, the communication module 140 is not limited to Bluetooth and may be based on other types of communication protocols, such as, for example, those that enable greater communication range/distance such as CDMA, FM, or the like.

In step S1002, when a plurality of page signals from a plurality of terminals are detected, the controller 150 may receive a PIN code from the terminals 200 and it may compare the received PIN code with the PIN code stored in the memory 190 of the lighting apparatus 100. Hence, the communication module 140 may establish the communication channel with the first terminal 200*a* having the highest preset priority among the terminals having the identical PIN code, in step S1003.

Here, the controller 150 may request a PIN code in response to the page signal. The request for the PIN code may be displayed at the terminal and transferred to the controller

150, for example, upon user input. The PIN code may also be previously stored on the terminal. The communication channel may be formed only with the terminal having a PIN code identical to a PIN code stored in the memory 190 of the lighting apparatus 100. Accordingly, there is an advantage of preventing unauthorized connection to the lighting apparatus 100. Also, the communication channel is formed based on the priority preset in the memory 190 and collision between multiple users having permissions to use the lighting apparatus 100 may be prevented.

In step S1004, it may be determined whether sound data is received from the terminal 200 at the communication module 140. When sound data is transmitted to the communication module 140 from the terminal 200, the switch device 180 may be switched on to drive the sound device 110, in step S1005. When sound data is not transmitted to the communication module 140 from the terminal 200, the switch device 180 may be switched off to stop driving the sound device 110, in step S1006.

As a result, the sound device 110 is not continuously driven irrespective of whether sound data is being received, and the sound device 110 may be driven only when the sound data is being received from a terminal 200 within range of the lighting apparatus 100. Accordingly, there is an advantage of reduced power consumption. Also, the control signal of the sound device 110 and the power supply to the sound device 100 may be controlled by the on/off state of the switch device 180 such that malfunction of the sound device 110 may be prevented, as previously described.

In step S1007, the sound data or lighting control data received from the first terminal 200*a* may be outputted to the sound device 110 and the light emitting device 120 based on the control of the controller 150. Meanwhile, it may be determined whether the sound data is not received for a preset time period, in step S1008. When sound data is not received for a prescribe amount of time, the switch device 180 may be switched off and the sound device 110 may be stopped and no longer driven, in step S1009. For example, the sound device 110 may be powered-off.

Accordingly, a lighting apparatus as broadly described and embodied herein may reduce unnecessary power consumption of an audio device of the lighting apparatus based on transmission of audio data from a terminal.

In one embodiment, a lighting apparatus may include an audio system, a light emitting device including a plurality of LEDs, a communication module to receive data for the audio system or the light emitting device, a switch provided between the communication module and the audio system to control a connection between the communication module and the audio system, and a controller to control the audio system and the light emitting device. The controller may be configured to determine whether the received data is associated with the lighting emitting device or the audio system, and controls the switch to connect to the audio system when the received data is associated with the audio system.

The controller may be configured to control the switch to connect the audio system to power on the audio system when the received data is associated with the audio system. The controller may be configured to control the switch to disconnect the audio system to power off the audio system when the received data is not associated with the audio system. The audio system may include a speaker and an amplifier, and wherein the switch powers off the amplifier when the received data is not associated with the audio system. The controller may control the switch to power off the audio system when data associated with the audio system is not received for a prescribed amount of time. Moreover, the data associated with the audio system may be audio data.

The communication module may be configured to receive a request from a plurality of terminals to establish a connection with the lighting apparatus, and wherein the controller controls the communication module to establish a connection with a terminal having the highest priority based on the requests. The priority of the requests may be determined based on a chronological order in which the requests are received. Moreover, the controller may control the communication module to not respond to the requests other than the request from the terminal with the highest priority.

The lighting apparatus may include a memory to store a PIN code for the communication module and a priority list for the plurality of terminals, wherein the controller compares PIN codes received from the plurality of the terminals with the PIN code stored in the memory and identifies the terminal having the highest priority among the plurality of terminals having PIN codes that match the stored PIN code. The controller may control the communication module to transmit a page signal to a first terminal in response to a page signal received from a second terminal during operation of the audio system and the light emitting device based on the data received from the first terminal. The controller may control the communication module to transmit a response to the second terminal that indicates the request for connection is denied based on a response to the page signal from the first terminal.

In response to a request for connection received from a second terminal after initiating a connection between a first terminal and the lighting apparatus, the controller may control the communication module to transmit a signal to the first terminal to request an authorization for connection for the second terminal. The controller may control the communication module to establish a connection with the second terminal in response to the authorization received from the first terminal. The communication module may receive audio data from the first terminal and lighting control data from the second terminal.

A memory may be provided for storing a plurality of commands for controlling the light emitting device, wherein, when the received data is audio data, the controller retrieves a stored command that corresponds to the received audio data and controls the light emitting device based on the retrieved command. Moreover, memory may be provided for storing a plurality of audio files, wherein the controller retrieves a stored audio file that corresponds to the received data for playback at the audio system.

The audio system may include a microphone, a filter configured to filter an analog audio signal from the microphone at a prescribed frequency, and an analog-to-digital converter (ADC) to convert the filtered analog audio signal, wherein the controller controls the light emitting device based on lighting control data received from a terminal based on the converted audio signal.

In one embodiment, a lighting apparatus may include an audio system, a light emitting device including a plurality of LEDs, a communication module to receive data for the audio system or the light emitting device, a switch provided between the communication module and the audio system to control a connection between the communication module and the audio system, and a controller to control the audio system and the light emitting device, wherein the controller is configured to determine whether the received data is associated with the lighting emitting device or the audio system, and controls the switch to power off the audio system when data associated with the audio system is not received for a prescribed amount of time.

In one embodiment, a method of controlling a lighting apparatus may include detecting a page signal from a remote terminal at a communication module, establishing a connection between the communication module and the remote terminal, receiving data from the remote terminal to control an audio system and a light emitting device, determining whether the received data is audio data, and controlling a switch to turn on when the received data is audio data and controlling the switch to turn off when the received data is not audio data, wherein the switch powers on the audio system in an on state and powers off the audio system in an off state.

In one embodiment, a lighting apparatus may include a sound unit; a light emitting unit comprising a plurality of light emitting devices; a control unit to control the sound unit and the light emitting unit; a communication module to receive sound data or lighting control data based on the control of the control unit; a switch part provided between the communication module and the sound unit to be controlled by the control unit; and at least one terminal to transmit the sound data or the lighting control data to the communication module based on setup inputted from the sound unit or the light emitting unit by a user, wherein the control unit switches on the switch part to control the sound unit, when the sound data is transmitted to the communication module from the terminal, and the control unit switches off the switch part, when the sound data is not transmitted to the communication module from the terminal.

The control unit may switch off the switch part to stop the driving of the sound unit, when the sound data is not transmitted for a predetermined time period in the On-state of the switch part. The control unit may control the communication module to form with a terminal having the highest priority with respect to a connection requesting order, when a page signal for data transmission is transmitted from a plurality of terminals. The control unit may control the communication channel not to respond to page signals of the other terminals, when the communication channel is formed with the terminal having the highest priority.

The lighting apparatus may further include a memory to store a PIN code of the communication module and a terminal connection priority, wherein the control unit compares PIN codes received from the plurality of the terminals with the PIN code stored in the memory, to control the communication module to form a communication channel with a first terminal having the highest preset priority out of the terminals having the identical PIN codes.

The control unit may control the communication module to transmit a page signal to the first terminal, when page signals are transmitted to the communication module from the other terminals during the driving of the sound unit and the light emitting unit based on the sound data or the lighting control data received from the first terminal. The control unit may control the communication module to transmit a reason for no connection to the other terminals not to form a communication channel, when receiving response to the page signal transmitted to the first terminal.

The control unit may control the communication module to transmit a signal for checking connection with a second terminal to the first terminal, when a page signal is transmitted to the communication module from a second terminal in a state of the communication channel being formed between the first terminal and the communication module.

The control unit may control the communication module to form communication channels with the first terminal and the second terminal, respectively, when a signal for allowing connection of the second terminal is received from the first terminal. The communication module may receive sound data from one of the first and second terminals and lighting control data from the other one.

A control signal of a light emitting unit driving part based on sound data may be stored in the memory, and the control unit may search on the memory to call a control signal of the light emitting unit based on the sound data, when only the sound data received from the first terminal. Sound data may be stored in the memory, and the control unit may search on the memory based on sound file information inputted from the first terminal to call the sound data. Moreover, in a state of forming communication channels between the communication module and a plurality of terminals, the control unit may control the communication module to shut off sound data reception from the other terminals when the communication module receives sound data from one of the terminals.

The lighting apparatus may further include a notifying part to display formation of a communication channel between the communication module and the terminal outside. The sound unit may include a sound detecting part to detect an external sound file; a filtering part to filter a frequency of the external sound file detected by the sound detecting part; and an analog-to-digital converter (ADC) to convert the analog signal filtered by the filtering part to a digital signal. Moreover, the control unit may transmit the digital signal to the first terminal and the control unit may receive the lighting control data corresponding to the digital signal from the first terminal to control the driving of the light emitting unit.

In another embodiment, a method of controlling a lighting apparatus may include a step of a communication module searching a page signal transmitted from a terminal; and a step of driving a sound unit by switching a switch part on when sound data is transmitted to the communication module from the terminal and stopping the driving of the sound unit by switching the switch part off when the sound data is not transmitted to the communication module from the terminal, in a state of forming a communication channel between the terminal and the communication module based on the page signal.

The method of controlling the lighting apparatus may further include a step of stopping the driving of the sound unit by switching the switch part off when the sound data is not transmitted for a predetermined time period during the driving of the sound unit. The method of controlling the lighting apparatus may further include a step of forming a communication channel between the communication module and a terminal having the highest priority with respect to a connection requesting order, when there are page signals of a plurality of terminals, after the step of the communication module searing the page signal transmitted from the terminal.

When the communication channel is formed with the terminal, the communication module may not respond to a page signal of the other terminals in the step of forming the communication channel between the communication module and the terminal having the highest priority with respect to the connection requesting order, when there are page signals transmitted from a plurality of terminals.

The method of controlling the lighting apparatus may further include a step of comparing PIN codes received from a plurality of terminals with a PIN code stored in a memory, when there is page signals transmitted from a plurality of terminals; and a step of forming a communication channel between the communication module and a first terminal having the highest preset priority out of terminals having the identical PIN code to the PIN code stored in the memory, after the step of the communication module searing the page signal transmitted from the terminal.

According to the disclosure, the driving of the sound unit may be controlled by on and off of the switch part controlled by the control unit based on sound data reception of the terminal. Accordingly, power consumption of the lighting apparatus may be reduced. Furthermore, the control unit may switch the switch part off unless the sound data is received for a predetermined time period in an on-state of the switch part. Accordingly, unnecessarily power consumption may be prevented. Still further, the control unit may control the control signal of the sound unit and the power supply by on and off of the switch part simultaneously. Accordingly, malfunction of the sound unit may be prevented.

Any reference in this specification to “one embodiment,” “an embodiment,” “example embodiment,” etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting apparatus comprising:

an audio system;

a light emitting device including a plurality of LEDs;

a communication module to receive data for the audio system or the light emitting device;

a switch provided between the communication module and the audio system to control a connection between the communication module and the audio system; and a controller to control the audio system and the light emitting device, wherein the controller is configured to determine whether the received data is associated with the lighting emitting device or the audio system, and controls the switch to connect to the audio system when the received data is associated with the audio system, wherein the controller is configured to control the switch to connect the audio system to power on the audio system when the received data is associated with the audiosystem, wherein the controller is configured to control the switch to disconnect the audio system to power off the audio system when the received data is not associated with the audio system, and wherein the controller controls the switch to power off the audio system when data associated with the audio system is not received for a prescribed amount of time.

2. The lighting apparatus of claim 1, wherein the audio system includes a speaker and an amplifier, and wherein the switch powers off the amplifier when the received data is not associated with the audio system.

3. The lighting apparatus of claim 1, wherein the data associated with the audio system is audio data.

4. The lighting apparatus of claim 1, wherein the communication module is configured to receive a request from a plurality of terminals to establish a connection with the lighting apparatus, and wherein the controller controls the communication module to establish a connection with a terminal having the highest priority based on the requests.

5. The lighting apparatus of claim 4, wherein the priority of the requests are determined based on a chronological order in which the requests are received.

6. The lighting apparatus of claim 4, wherein the controller controls the communication module to not respond to the requests other than the request from the terminal with the highest priority.

7. The lighting apparatus of claim 4, further comprising:

a memory to store a PIN code for the communication module and a priority list for the plurality of terminals, wherein the controller compares PIN codes received from the plurality of the terminals with the PIN code stored in the memory and identifies the terminal having the highest priority among the plurality of terminals having PIN codes that match the stored PIN code.

8. The lighting apparatus according to claim 7, wherein the controller controls the communication module to transmit a page signal to a first terminal in response to a page signal received from a second terminal during operation of the audio system and the light emitting device based on the data received from the first terminal.

9. The lighting apparatus of claim 8, wherein the controller controls the communication module to transmit a response to the second terminal that indicates the request for connection is denied based on a response to the page signal from the first terminal.

10. The lighting apparatus of claim 1, wherein, in response to a request for connection received from a second terminal after initiating a connection between a first terminal and the lighting apparatus, the controller controls the communication module to transmit a signal to the first terminal to request an authorization for connection for the second terminal.

11. The lighting apparatus of claim 10, wherein the controller controls the communication module to establish a connection with the second terminal in response to the authorization received from the first terminal.

12. The lighting apparatus of claim 11, wherein the communication module receives audio data from the first terminal and lighting control data from the second terminal.

13. The lighting apparatus of claim 1, further including a memory for storing a plurality of commands for controlling the light emitting device, wherein, when the received data is audio data, the controller retrieves a stored command that corresponds to the received audio data and controls the light emitting device based on the retrieved command.

14. The lighting apparatus of claim 1, further including a memory for storing a plurality of audio files, wherein the controller retrieves a stored audio file that corresponds to the received data for playback at the audio system.

15. The lighting apparatus of claim 1, wherein the audio system includes a microphone, a filter configured to filter an analog audio signal from the microphone at a prescribed frequency, and an analog-to-digital converter (ADC) to convert the filtered analog audio signal, wherein the controller controls the light emitting device based on lighting control data received from a terminal based on the converted audio signal.

16. A lighting apparatus comprising:

an audio system;

a light emitting device including a plurality of LEDs;

a communication module to receive data for the audio system or the light emitting device;

a switch provided between the communication module and the audio system to control a connection between the communication module and the audio system; and a controller to control the audio system and the light emitting device, wherein the controller is configured to determine whether the received data is associated with the light emitting device or the audio system, and controls the switch to power off the audio system when data associated with the audio system is not received for a prescribed amount of time.

17. A method of controlling a lighting apparatus comprising:

detecting a page signal from a remote terminal at a communication module;

establishing a connection between the communication module and the remote terminal;

receiving data from the remote terminal to control an audio system and a light emitting device;

determining whether the received data is audio data; and controlling a switch to turn on when the received data is audio data and controlling the switch to turn off when the received data is not audio data, wherein the switch powers on the audio system in an on state and powers off the audio system in an off state.

* * * * *